United States Patent
Jahangir et al.

(10) Patent No.: US 12,499,533 B2
(45) Date of Patent: Dec. 16, 2025

(54) COMPUTER-IMPLEMENTED, ADAPTED ANOMALY DETECTION METHOD FOR POWDER-BED-BASED ADDITIVE MANUFACTURING

(71) Applicant: Siemens Energy Global GmbH & Co. KG, Bayern (DE)

(72) Inventors: Hamid Jahangir, Aachen (DE); Vivian Schiller, Stuttgart (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 403 days.

(21) Appl. No.: 18/014,969

(22) PCT Filed: May 5, 2021

(86) PCT No.: PCT/EP2021/061867
§ 371 (c)(1),
(2) Date: Jan. 6, 2023

(87) PCT Pub. No.: WO2022/012796
PCT Pub. Date: Jan. 20, 2022

(65) Prior Publication Data
US 2023/0260103 A1    Aug. 17, 2023

(30) Foreign Application Priority Data
Jul. 16, 2020   (EP) .................................... 20186278

(51) Int. Cl.
*G06T 7/00* (2017.01)
*B22F 10/36* (2021.01)
(Continued)

(52) U.S. Cl.
CPC .............. *G06T 7/001* (2013.01); *B22F 10/36* (2021.01); *B22F 12/90* (2021.01); *B33Y 50/02* (2014.12);
(Continued)

(58) Field of Classification Search
CPC ..................... G06T 7/001; G06T 7/168; G06T 2207/10024; G06T 2207/10072;
(Continued)

(56) References Cited

PUBLICATIONS

Snell, R., Tammas-Williams, S., Chechik, L. et al. Methods for Rapid Pore Classification in Metal Additive Manufacturing. JOM 72, 101-109 (2020). https://doi.org/10.1007/s11837-019-03761-9 (Year: 2019).*

(Continued)

*Primary Examiner* — Matthew C Bella
*Assistant Examiner* — Jinsu Hwang
(74) *Attorney, Agent, or Firm* — Wolter Van Dyke Davis, PLLC (57) ABSTRACT

A computer-implemented anomaly detection method in powder-bed-based additive manufacture of a workpiece includes (i) providing an image data set and applying a Principal Component Analysis to said image data to compute a number of image clusters, (ii) applying a clustering algorithm to the analyzed image data and computing respective cluster centroids, (iii) comparing the computed cluster centroids with a set of reference anomaly centroids, wherein based on a match of cluster centroids with the reference, the image data is segmented layerwise into cluster images of a specific anomaly, (iv) transforming the segmented images into a defined color space, such as a Lab color space or greyscale spectrum, and, (v) integrating a pixel information of the transformed segmented cluster images to compute a threshold value for the image data set in order to determine a respective anomaly.

17 Claims, 3 Drawing Sheets

(51) Int. Cl.
   *B22F 12/90* (2021.01)
   *B33Y 50/02* (2015.01)
   *G06T 7/168* (2017.01)

(52) U.S. Cl.
   CPC .... *G06T 7/168* (2017.01); *G06T 2207/10024* (2013.01); *G06T 2207/10072* (2013.01); *G06T 2207/20021* (2013.01); *G06T 2207/30164* (2013.01); *G06T 2207/30204* (2013.01)

(58) Field of Classification Search
   CPC . G06T 2207/20021; G06T 2207/30164; G06T 2207/30204; B33Y 50/02; B22F 12/90; B22F 10/36
   See application file for complete search history.

(56) References Cited

PUBLICATIONS

Grasso, M., Laguzza, V., Semeraro, Q., and Colosimo, B. M. (Nov. 10, 2016). "In-Process Monitoring of Selective Laser Melting: Spatial Detection of Defects Via Image Data Analysis." ASME. J. Manuf. Sci. Eng. May 2017; 139(5): 051001. https://doi.org/10.1115/1.4034715 (Year: 2016).*

PCT International Search Report and Written Opinion of International Searching Authority mailed Aug. 9, 2021 corresponding to PCT International Application No. PCT/EP2021/061867 filed May 5, 2021.

Grasso, Marco Luigi et al; "In-Process Monitoring of Selective Laser Melting: Spatial Detection of Defects Via Image Data Analysis"; Journal Of Manufacturing Science And Engineering; vol. 139; No. 5; XP055762386; ISSN: 1087-1357; DOI: 10.1115/1.4034715; 2016.

Snell, Robert et al; "Methods for Rapid Pore Classification in Metal Additive Manufacturing"; Journal of Metals; Springer New York LLC; vol. 72; No. 1, pp. 101-109; XP036968291; ISSN: 1047-4838; DOI: 10.1007/S11837-019-03761-9; 2019.

Anonymous; "Can k-means clustering do 1-15 classification?", Stackoverflow, Apr. 29, 2020 (Apr. 29, 2020), XP055762507, Internet; Retrieved from the Internet:URL:https://stackoverflow.com/questions/22300830/can-k-means-clustering-do-classification; [retrieved on Dec. 23, 2020].

* cited by examiner

COMPUTER-IMPLEMENTED, ADAPTED ANOMALY DETECTION METHOD FOR POWDER-BED-BASED ADDITIVE MANUFACTURING

CROSS REFERENCE TO RELATED APPLICATIONS

This application is the US National Stage of International Application No. PCT/EP2021/061867 filed 5 May 2021, and claims the benefit thereof. The International Application claims the benefit of European Application No. EP20186278 filed 16 Jul. 2020. All of the applications are incorporated by reference herein in their entirety.

FIELD OF INVENTION

The present invention relates to a computer-implemented (adapted) anomaly detection or defect prediction method for powder-bed-based additive manufacturing processes. The presented approach, preferably, relates to a semi-supervised adaptive thresholding methodology e.g. as part of image processing for the described anomaly detection. To this effect the overall methodology is neither a (full) supervised machine detection or machine learning approach, nor a (full) unsupervised machine learning approach; but preferably an intermediate solution. Said approach is applicable for all types of powder-bed-based additive manufacturing processes, such as for processing plastics or metals. Most preferably, the presented solution is applicable to the additive manufacture of parts or workpieces established by laser powder bed fusion (LPBF) out of a powder bed. Such additive manufacturing techniques generally comprise e.g. powder-bed-fusion methods, such as selective laser melting (SLM) or selective laser sintering (SLS) or electron beam melting (EBM). Further additive manufacturing approaches relate to "Directed Energy Deposition (DED)", such as laser cladding, electron beam or plasma welding, metal inkjet molding (MIM), so-called sheet lamination methods, or thermal spraying (VPS, LPPS) methods, cold spraying (GDCS).

Preferably, such workpieces are high-performance parts, like components applied in power generation, aerospace or the automotive sector. The component may as well be a component of a turbo machine, e.g. in the flow path hardware of a gas turbine. The component is, thus, preferably made of a nickel- or cobalt-based superalloy, particularly a precipitation hardened alloy.

BACKGROUND OF INVENTION

Additive manufacturing, particularly powder-bed methods have proven to be useful and advantageous in the fabrication of prototypes or complex components, such as components with a mazelike or convoluted structure or functionally cooled components. Further, the additive manufacture stands out for its short chain of process steps which in turn enables material economization and a particularly low lead time.

Powder bed fusion manufacturing devices or setups for the given methods usually comprise a manufacturing or build platform on which the component is built layer-by-layer after the feeding of a layer of base material which may then be melted, e.g. by an energy beam, such as a laser, and subsequently solidified. The layer thickness is determined by a recoater that moves, e.g. automatically, over the powder bed and removes excess material from a manufacturing plane or build space. Typical layer thicknesses amount to between 20 μm and 40 μm. During the manufacture, said energy beam scans over the surface and melts the powder on selected areas which may be predetermined by a CAD-file according to the geometry of the component to be manufactured. Said scanning or irradiation is, preferably, carried out in a computer implemented way or via computer-aided means, such as computer aided manufacturing (CAM) instructions, which may be present in the form of a dataset. Said dataset or CAM-file may be or refer to a computer program or computer program product.

Such manufacturing devices are usually equipped with different types of optical process monitoring systems, such as CCD or sCMOS cameras or (other) photodiode-based systems. These systems generate layerwise images of the workpiece during its build-up. These images usually need to be analysed for anomalies, such as so-called hot spots, cold spots, over- or underexposed regions, or other anomalies. These defects are often crucial to the workpiece's structure. Due to the complexity of the mentioned selective melting (welding) processes such anomalies or defects are likely to occur during the buildup of any component. If such defects were not detected early on, this would probably lead to scrapping of the part and to a waste of process capacity and manufacturing time.

Usually, anomalies are detected by means of image data, particularly using static thresholding-based image processing algorithms or other machine learning approaches. However, these approaches are still not robust enough to detect defects or anomalies and the abundance of image data to be rendered and processed. Furthermore, thresholds usually need to be defined for specific types of anomalies. This is often done manually by an operator of the given process. In addition, static thresholds may cause inconsistencies when image settings are changed. Therefore, automatic evaluation of multisource image data using a general, automated method or approach is still not possible.

Until now, the threshold values are usually determined by experts or machine operators themselves by means of manual color value analyses of the respective images. If the images are to be processed on a basis of other characteristics, threshold values must again be determined manually. Threshold values must also be adjusted manually for each dataset. Setting the threshold values manually by different experts, however, leads to inconsistencies in the results. Extensive research has already been performed using so-called supervised machine learning approaches to predict the anomalies in the underlying image data. However, this nevertheless leads to the generation of huge amounts of (unlabelled) data which has to be labelled or classified by the user in a manual way. Further complicating is the fact that such approaches are hardware-specific.

SUMMARY OF INVENTION

It is, thus, an object of the present invention to provide means which help to overcome the mentioned drawbacks. Particularly, a semi-automated determination of adaptive thresholds is provided that adapts to the recorded dataset during process monitoring. This approach is intended to allow different users with different levels of knowledge and expertise to evaluate data sets in order to provide consistent results.

The mentioned object is achieved by the subject-matters of the independent claims. Advantageous embodiments are subject-matters of the dependent claims.

An aspect of the present invention relates to a computer-implemented anomaly detection method in powder bed based additive manufacturing of a workpiece comprising providing an image data set, such as a stack of layered image data, and applying a so-called Principal Component Analysis (PCA) to said image data in order to compute a number of image clusters. Said PCA usually serves the purpose to structure, simplify or illustrate statistical variables in huge amounts of data in that said variables are approximated by a smaller number of significant linear combinations or "components".

The method further comprises applying a clustering algorithm to the analysed image data and computing respective cluster centroids, such as corresponding to the computed number of image clusters. According to this embodiment, advantageously, the computed cluster centroids or centroid positions may be used as a reference template for further processing of the respective fraction of data or variable.

In an embodiment, a k-means clustering, a fuzzy C-Means clustering or a density-based spatial clustering algorithm, such as a DBSCAN ("Density-Based Spatial Clustering of Applications with Noise") is applied for the clustering and the computing of the clusters centroids. A k-means clustering algorithm is e.g. a method for quantifying vectors or objects, wherein a predefined number of K groups or clusters is generated out of an amount of similar objects.

The method further comprises storing and/or comparing the computed cluster centroids with a set of reference anomaly centroids, such as of a reference template, wherein—based on a match of the determined computed cluster centroids with the reference—the image data is segmented layerwise into cluster images of a specific anomaly.

The method further comprises transforming the segmented images (from an as-is state), such as from an RGB colour space into a defined colour space, like a Lab colour space or greyscale spectrum. The decision between the Lab colour space or greyscale space may depend on the respective input data type.

The method further comprises integrating a pixel information of the transformed segmented cluster images to compute a threshold value for the image data set in order to determine a respective anomaly or process defect during the manufacture of the workpiece.

In this way, a concept is provided in which un- or semi-supervised machine learning algorithms are utilised to decompose the images into component images and reveal respective anomaly patterns.

In other words, the presented method advantageously allows to automatedly or semi-automatedly and reliably evaluate an image data set independently of user input-based inaccuracies. The method is particularly suitable and effective for determining threshold values for patterns that are difficult to distinguish. In particular, the quality of the adaptively determined threshold values as described herein is—for the presented approach—far superior than if such threshold values were to be determined manually by experts.

As compared to state-of-the-art, unsupervised, machine learning, detection or prediction algorithms, the presented approach calculates adaptive thresholds as described herein. Thereby, advantageously, unsupervised machine learning is used to find defect or anomaly patterns in unlabelled data. In other words, the present invention relates to an adaptive and color- or intensity-based calculation of threshold values for new datasets and image patterns. Still further, the presented approach can advantageously be applied to all types of image data. It cannot only be applied for optical process monitoring data but also for any other applications in computer vision.

More particularly, the presented approach can, advantageously, applied in serial additive production of workpieces or components in an ever more industrialised way; provided that the given hardware is equipped with in-situ optical monitoring systems, such as optical cameras or other sensor technology (see below). In this way, the invention helps to further broaden the scope of additive manufacturing technologies in general.

Due to the possible early defect detection, a related build job can further actively interrupted and hence material and manufacturing time and cost saved.

In an embodiment, a "hot spot", a "cold spot", a blob defect, or e.g. an overexposed or underexposed region can be detected or predicted in the recorded image of the powder bed during the manufacture of the given workpiece. As will be described further below, a hotspot or cold spot may refer or be recorded by means of an RGB color image, whereas an under-fused or over-fused region in the powder bed may relate to a greyscale picture. As an advantage, the detection of such defects, hot spots or cold spots, allows for a later correlation of the given images to actual structural defects in the workpiece and/or with further analyses or monitoring data of the given build job.

In an embodiment the image data is constituted by a stack of layered images, such as photographic and/or optical tomography data.

In an embodiment the image data set is provided by a stack of random and/or test images as a reference which are subjected to a PCA and, such as subsequently, to a clustering algorithm (cf. above) for computing respective cluster centroids, wherein the image clusters are, such as visually and/or manually, selected in order to provide for a reference anomaly centroids information. According to this embodiment said reference information may relate to an unlabelled test template for providing the reference anomaly centroids, e.g. a stack of between 20 to 50 images. According to this embodiment, a one-time manual selection of relevant patterns (labelling) can be carried out.

In an embodiment said image data is constituted by an input of an optical monitoring system of powder bed fusion device, such as a CCD, sCMOS or any other photodiode based sensor, and said image data forms a test reference.

In an embodiment, for the integration, a lower, such as a minimum, and/or an upper, such as maximum, threshold value is computed for the image data set in order to provide a threshold image for the respective anomaly. In this way, the defect or anomaly detection can be carried out most expediently, and such that the inventive advantages can be achieved.

In an embodiment, the computed threshold values are used or foreseen as input parameters (source data input) for a subsequent anomaly detection, thresholding or image processing method. These computed thresholds can also be used further for the same source data input especially in the case of the serial production of new data input from the same printer or manufacturing device.

In an embodiment, an anomaly is marked in each layer of the image data set and formed into anomaly clusters, such as by using a nearest neighbour search algorithm or cluster position computation, like a Connected Component Labelling, a Proximity or Closest Point Search, a Point Location or Point in Triangle Search or a k-Nearest Neighbor algorithm.

In an embodiment, the location and/or a size of the respective anomaly cluster is determined with reference to the actual workpiece geometry. According to this embodiment, a size and a location of the anomaly or anomaly cluster may be computed based on the camera pixel field and lateral coordinates. Thereby, subsequently, a region of interest extraction may be carried out, wherein a position of the detected cluster (and size) is used for computing a part severity or (layerwise) severity of the manufactured structure.

In an embodiment anomaly cluster information, comprising a location, a size and/or a severity indicator of the given cluster is stored in a report file, such as a point cloud or point cloud database.

In an embodiment, a so-called point cloud database is used as output data format for the size, the location and/or severity of the given cluster or part anomaly.

In an embodiment an anomaly cluster information, comprising location, size and/or a severity indicator of the given anomaly cluster is correlated with real material manufacturing defects. According to this embodiment, better insights can be derived for post-inspection, quality control or further aspects of upcoming additive manufacturing processes or related manufacturing parameters development.

Another aspect of the present invention relates to a method of manufacturing a workpiece out of a powder bed by selective laser sintering, selective laser melting or electron beam melting, applying the computer-implemented anomaly detection method as described above.

Another aspect of the present invention relates to a data processing apparatus configured to carry out the method as described, wherein the apparatus further comprises an interface to a powder bed fusion device or a related monitoring system.

A further aspect of the present invention relates to a computer program product comprising instructions or information which, when a corresponding program is executed by a data processing apparatus or a computer, cause it to carry out the described method steps.

A computer program product as referred to herein may relate to a computer program means constituting or comprising a storage medium like a memory card, a USB stick, a CD-ROM, a DVD or a file downloaded or downloadable from a server or network. Such product may be provided by a wireless communication network or via transfer of the corresponding information by the given computer program, computer program product or computer program means.

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

Advantages and embodiments relating to the described method and/or the computer program product may as well pertain or be valid with regard to the manufacturing method and the data processing apparatus as described.

BRIEF DESCRIPTION OF THE DRAWINGS

Further features, expediencies and advantageous embodiments become apparent from the following description of the exemplary embodiments in connection with the Figures.

DETAILED DESCRIPTION OF INVENTION

Like elements, elements of the same kind and identically acting elements may be provided with the same reference numerals in the figures. The Figures are not necessarily depicted true to scale and may be scaled up or down to allow for a better understanding of the illustrated principles. Rather, the described figures are to be construed in a broad sense and as a qualitative base which allows a person skilled in the art to apply the presented teaching in a versatile way.

The term "and/or" as used herein shall mean that each of the listed elements may be taken alone or in conjunction with two or more of further listed elements.

Figure 1:
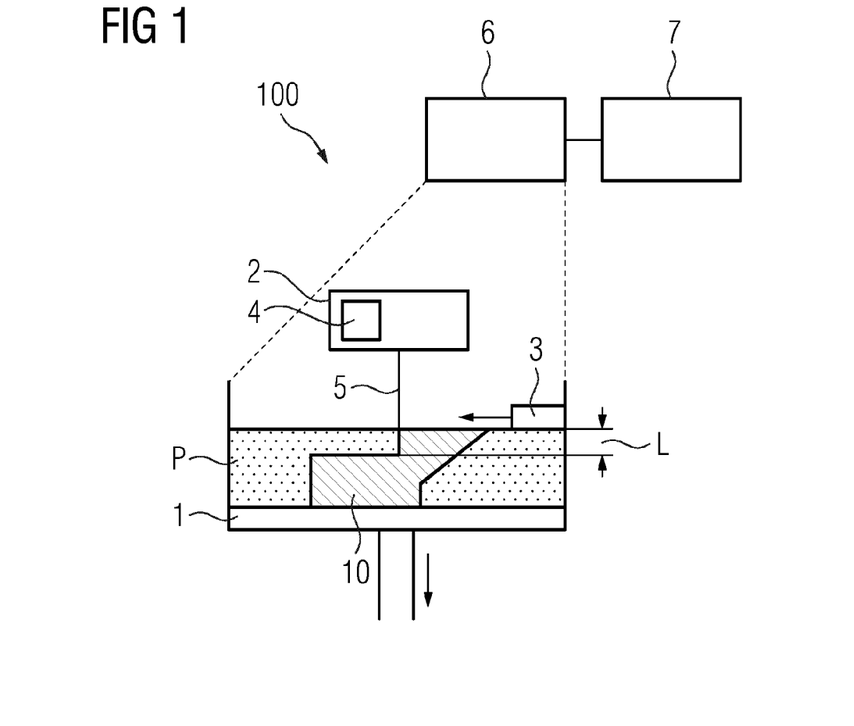
FIG. 1 shows a schematic sketch of the principle of a powder bed based additive manufacturing process.

FIG. 1 shows an additive manufacturing device 100. Said device 100 may be a conventional device for manufacturing any type of components by powder-bed-fusion (PBF). Such techniques employ a bed of a powder or base material P which is selectively and layerwise exposed to or irradiated by an energy beam 5, such as a laser or an electron beam of an irradiation apparatus or energy beam source 2. Accordingly, the given PBF method may relate to selective laser sintering, selective laser melting or electron beam melting. Said processes allow to establish a workpiece or part 10 on top of a build platform 1 in that powdery layers L for the part 10 are fused or welded onto said platform 1 and consecutively irradiated by selectively solidified by the beam 5 according to its predefined (CAD-)geometry. After the irradiation or fusing of each layer, the build platform 1 is usually lowered according to the layer thickness and a new base material layer is deposited on a manufacturing plane by a recoater or recoating device 30.

The irradiation apparatus 20 is connected to or may be controlled by a control device 4, e.g. comprising a build processor means.

The device 100 may further feature a, preferably optical, monitoring system 6, such as comprising a CCD or sCMOS camera or any other photodiode type imaging system with which layerwise images can be taken during the build job, such as one image after a powder recoating step and one image after a related (selective) laser scanning step. Particularly long exposure imaging in combination with a certain NIR (near infrared) filter or the like may be used to capture an intensity value of radiation emitted from the powder bed.

The workpiece 10 as referred to herein may particularly relate to a part or an article of complex shape, such as with filigree portions of structures. Preferably, said part is made of a high-performance material, such as a material of great strength and/or thermal resistivity. Particularly, said part may constitute a part of a steam or gas turbine component, such as a blade, vane, shroud, shield, such as heat shield, tip, segment, insert, injector, seal, transition, burner, nozzle, strainer, orifice, liner, distributor, dome, boost, cone, lance, plate, resonator, piston or any corresponding retrofit kit. Alternatively, said component may relate to another or similar component.

Figure 2:
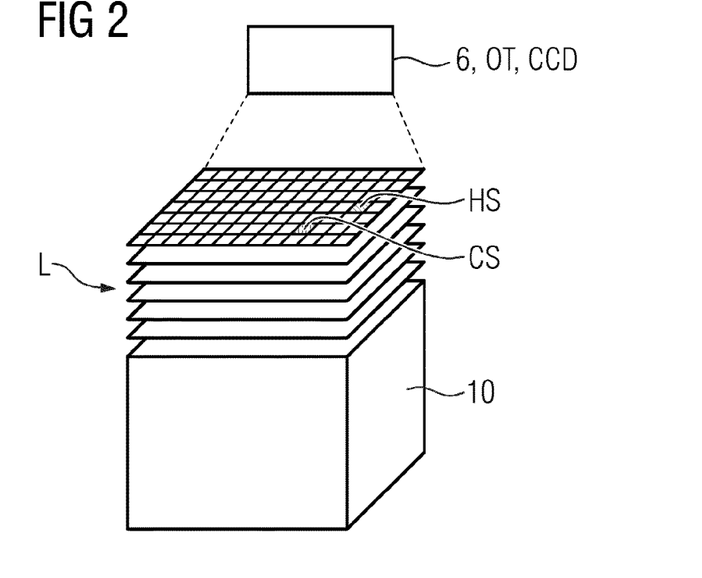
FIG. 2 indicates details of such a manufacturing process and particulars of a related anomaly detection applied during such manufacturing.

FIG. 2 indicates a schematic perspective view of a stack of layers L above a workpiece 10. The layer stack shall indicate subsequent layers L for the component 10 to be selectively irradiated or—as the case maybe—optical images taken in order to detect anomalies in the process, be it in the powder layer or in the already (partly) solidified layer. The stack of layers as shown in FIG. 2 may as well relate to optical tomography data as set forth below. By way of the topmost layer of the stack as indicated in FIG. 2, an anomaly detection shall be illustrated.

It is shown that the optical monitoring system 6 may particularly detect, record or register different types of defects, flaws or anomalies, e.g. after a selective melting step has been carried out. In the upper right part of the topmost layer, particularly a hot spot HS shall be indicated, i.e. a region in the powder bed or structure for the workpiece 10 which has e.g. been overexposed by the energy beam 5. To this effect, a local or spatial energy density, brought in the powder bed may have been chosen too excessive as to result in a sufficient irradiation result. It is known that excessive heat causes powder particles to evaporate and may cause voids or so-called "keyhole porosity" in the workpiece's structure, i.e approximately spherical bubbles in the structure of the part.

It is apparent that a stable melting or irradiation process requires irradiation parameters to be selected in a reasonable process "window", i.e. a range of parameters which allow a good structural result, preferably without or poor in defects and anomalies. It is, of course, not only the energy parameter which can cause hot spots and other defects. Also material or the geometry of the workpiece itself (which is of course oversimplified in the scheme of FIG. 2) may lead to hotspots at corners of the contour of the workpiece, e.g. where the energy output is critical. It is known that the mere powder bed, e.g. surrounding solidified structures for the workpiece 10, is thermally "quasi-insulating" and excess heat needs to be dissipated via the build plate (not explicitly indicated in FIG. 2).

On the other hand, cold spots CS as indicated in the lower part of the upmost layer in FIG. 2 may arise. These cold spots CS may be attributed to an underexposed region, e.g. wherein the energy applied by beam 5 to the powder was not sufficient to fully and reliably melt the related powder bed regions. These cold spots CS may likewise result in an adverse structural quality, such as a residual porosity in the powder P.

In general, the presented approach as well as the optical monitoring system 6 is capable of detecting a plurality of defects, such as the described hot spot HS, cold spots CS, a related overfused and/or an underfused region, but also so-called blob defects, in the buildup structure for the workpiece 10.

All of the listed types of anomalies in the process may lead to scrap or waste of the whole component, particularly when the manufacture of high-performance materials is concerned. This leads in turn to a waste of manufacturing time and resources.

In fact, as described above, a porosity defect can only reliably be detected when repeatedly occurring at the same location in the layered build-up, i.e. over an extension of two to three layers or more, for instance.

Figure 3:
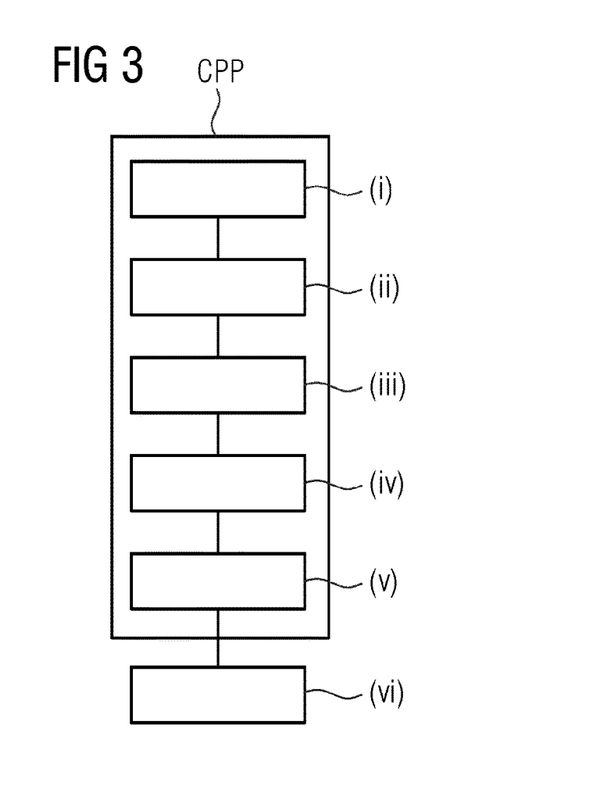
FIG. 3 indicates a schematic flow chart of process steps according to the present invention.

FIG. 3 indicates in a simplified schematic, method steps according to the method of the present invention. Said method being preferably computer-implemented, is an anomaly detection approach for an application of powder bed based additive manufacturing processes.

The method comprises, (i), providing an image data set OT, such as a stack of layered data recorded during a one-time build job or only during the manufacture of a plurality of layers. This step further applies a Principal Component Analysis PCA to said image data to compute or analyse a number of image clusters C. Said PCA in fact restructures characteristic variables in the image data set and extracts an amount of relevant cluster numbers, wherein at least some clusters out of many indicate or relate to a sort of anomaly or defect as described above. The remainder of the clusters may include information about background or non-anomaly data information. Because in the (visual) selection and/or when comparing the centroids with the reference centroids, the anomaly clusters get identified.

The method further comprises, (ii), applying a clustering algorithm to the analysed image data and computing respective cluster centroids C, such as corresponding to the computed number of image clusters. Said clustering may relate to a so-called k-means clustering, a fuzzy C-Means clustering or a density-based spatial clustering algorithm, such as a so-called DBSCAN.

The method further comprises, (iii), comparing the computed cluster centroids C with a set of reference anomaly centroids, wherein—based on a match of cluster centroids with the reference—the image data is segmented (layerwise) into cluster images of a specific anomaly. Only the segmented clusters or anomalies are processed any further, such as e.g. five clusters out of a number of 20 overall quantified clusters or the like are segmented. Furthermore, each type of anomaly cluster is then processed serially and/or separately.

The method further comprises, (iv), transforming the segmented images into a defined color space, such as a Lab (Lab) color space or greyscale (GV) spectrum, this particularly facilitates the detection of anomalies by way of a thresholding approach as will be described below.

The method further comprises, (v), integrating a pixel information of the transformed segmented cluster images to compute a threshold value for the image data set in order to determine a respective anomaly (cf. reference numerals a, tin FIG. 4 below).

Due to this thresholding, the whole presented detection or monitoring solution may be implemented in an only semi-automated or semi-supervised way. This brings e.g. advantages over a fully automated way which suffers from the drawbacks as listed further above.

Figure 4:
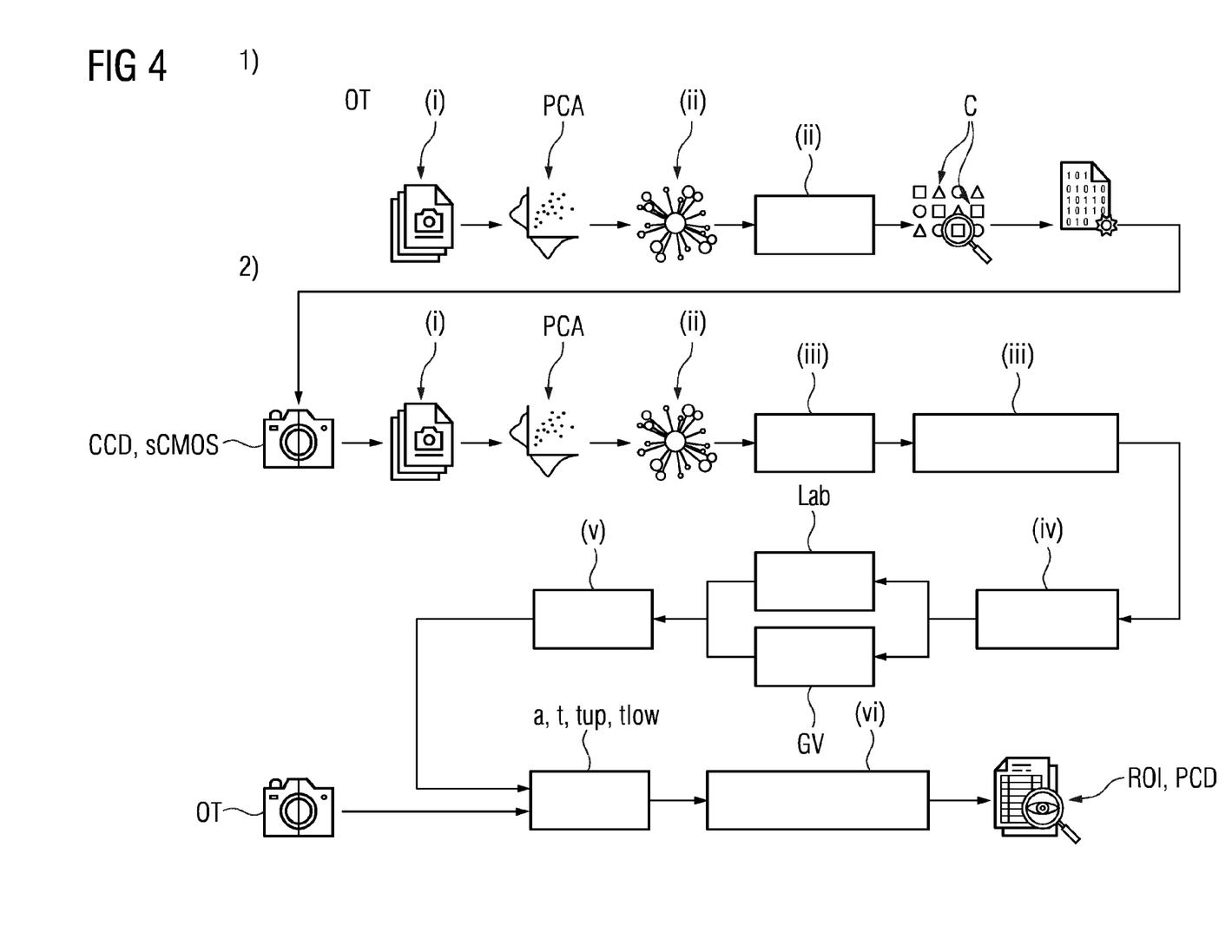
FIG. 4 indicates a process flow of the presented anomaly detection method in more detail.

FIG. 4 indicates particulars of the presented approach in more detail. Some aspects of the present invention may in this regard be described in a redundant way.

The upper part or line of the indicated flow chart or chart of pictograms in FIG. 4 under step "1)" may relate to a reference template generation which may be carried out at least in a one-time computational step.

Actually, the described image data set OT or stack of optical images is—provided that the whole manufacturing and printer setup is validated for the first time—supplied by a stack of random and/or test images as a reference, which are then subjected to a Principal Component Analysis PCA and to a clustering algorithm for computing cluster centroids C (similarly as described above), wherein the image clusters are selected in order to provide for a reference anomaly centroids information.

In other words, a dimensional reduction algorithm can be applied by the PCA in combination with clustering algorithm, preferably "k-means", to form the clusters from the image data and computing the cluster centroids. Each cluster centroid is referred to the "sub-components" of an individual image.

Then, e.g. by visual and/or "manual" selection (via a "Yes" and "No"), the cluster centroids C that refer to the desired anomalies are selected and exported as a reference template file. Which can be used as a reference template to match the similar anomalies from new image data (see "2)"

below). As the amount of structured, labelled or available data increases, of course also the accuracy and quality of the presented anomaly detection increases. I.e. the better the data input gets, the better is potentially a resolution of the presented thresholding and anomaly detection functionality. Generally, accuracy will usually be increased to a certain level. Then, after a certain data input, accuracy will flatten because the centroid values will not change drastically anymore. But if e.g. different data input stems from different build jobs, whereas monitoring data stem from the same machine and optical tomography system, then accuracy will increase depending on the geometry and/or features within the data, as this would generate different cluster values.

To this extent in turn also the whole manufacturing process and its reproducibility may be improved. This further manifests in a more reliable manufacturing route as a whole and helps to industrialise the additive technologies in general.

In the bottom part of FIG. 4 (cf. "2)") it is, particularly shown that adaptive threshold values or ranges are computed for new data and detected anomalies. The image data recorded by e.g. a CCD camera, of the optical monitoring system 6 may be taken as an input. The method steps described under step "1)" are then carried out anew and further processed until step (v) (see FIG. 3 above). The PCA (analysis) is performed on each layerwise image and the cluster number is computed. Based on this cluster number, k-means clustering decomposes an image into the relevant clusters (indicated as dots and spheres in the pictograms) and cluster centroids are computed. Then, the newly computed cluster centroids get compared with the reference anomaly centroids. Based on the matched centroid clusters, the corresponding image set get segmented and generate images with anomalies only. New segmented images of a given color space get transformed into LAB color space or grey spectrum depending on its input format (color/greyscale images). In other words, a new grid with individual color plane is formed where pixel-wise intensity values get integrated to compute the lower and upper thresholds for the dataset (cf. above).

For the described integration, preferably a lower value (cf. $t_{low}$) and/or an upper threshold value $t_{up}$ is computed for the image data set in order to provide a threshold range for the respective anomaly. These computed thresholds can also be used further for the same source data input, especially in the case of the serial production or new data input from the same printer, as shall be indicated by the further OT data input from the left in the bottom row of FIG. 4. New computed thresholds may then become input parameters for conventional thresholding based image processing algorithms where anomalies get marked on layerwise images, and formed into clusters using nearest neighbor methods and finally compute the location and size of the respective anomaly using a pixel size and a field of view information, such as e.g. based on the pixel coordinates (x,y) of the respective layer.

Then, further below, it shall be indicated by numeral (vi) (cf. the general flowchart of the method of FIG. 3 above) that an anomaly a is marked in each layer L of the image data set and formed into anomaly clusters, such as by using a nearest neighbor search algorithm, like a Connected Component Labeling, a Proximity or Closest Point Search, a Point Location or Point in Triangle Search or a k-Nearest Neighbor algorithm.

Subsequently, a location and/or a size of the respective anomaly cluster may be determined with reference to the actual workpiece geometry. Thereby, a region of interest ROI may be used or extracted. This may particularly be implemented via binary mask with a related ROI information; or by similar means. In other words, defect or anomaly clusters may be registered with in specified region of interest ROI. Based on this information, e.g. an information of a specific location, dimensional and/or a severity indicator of a given anomaly cluster may be computed and reported, such as by way of a point cloud database PCD. The database may e.g. comprise a layerwise position and severity information of each type of anomalies which may in turn be correlated with real material or manufacturing defects, which may be detected either in-situ by other monitoring approaches or e.g. by computed tomography as post-manufacturing inspection.

A generated anomaly information file (location, size and severity) can then be used as quality report or further used to accelerate printing process parameter development or used with post-inspection data to correlate with real material defects.

All process steps may be carried out by a data processing device, such as the apparatus as depicted in FIG. 1 by reference numeral 7. To this effect, the presented method may be fully or partly implemented by generic data processing means.

Overall advantages of the presented methodology particularly allow to determine threshold values for characteristic areal data that may indicate defects or anomalies in the powder bed process. The image data of the process monitoring systems can then be processed during the threshold values determined and defect areas can be identified. Finally, the proposed approach can be applied in serial production as the generated adaptive thresholds can be used for in-situ monitoring to take actively part, such as by interrupting an underlying build job.

The invention claimed is:

1. A computer-implemented anomaly detection method in powder-bed-based additive manufacture of a workpieces, comprising:
   (i) providing an image data set (OT) and applying a Principal Component Analysis (PCA) to analyze said image data to compute a number of image clusters (C),
   (ii) applying a clustering algorithm to the analysed image data and computing respective cluster centroids (C),
   (iii) comparing the computed cluster centroids (C) with a set of reference anomaly centroids, wherein, based on a match of cluster centroids with the reference anomaly centroids, the image data is segmented layerwise into segmented cluster images of a specific anomaly,
   (iv) transforming the segmented cluster images into a defined color space, and
   (v) integrating a pixel information of the transformed segmented cluster images to compute a threshold value for the image data set in order to determine a respective anomaly (a, t), wherein a lower and/or an upper threshold value ($t_{up}$, $t_{low}$) is computed for the image data set in order to provide a threshold range for the respective anomaly.

2. The method according to claim 1, wherein the clustering algorithm comprises a K-Means Clustering, a Fuzzy C-Means Clustering, a Density-Based Spatial Clustering algorithm, or a DBSCAN.

3. The method according to claim 1, further comprising: detecting a "hot spot" (HS), a "cold spot" (CS), a blob defect, an overexposed and/or an underexposed region in a powder bed during manufacture of the workpieces.

4. The method according to claim 1, further comprising:
constituting said image data (OT) by a stack of layered images, comprising photographic and/or optical tomography data.

5. The method according to claim 4,
wherein step (i) providing the image data (OT) set comprises providing a stack of random and/or test images as a reference, which are subjected to a Principal Component Analysis (PCA) and to a clustering algorithm for computing cluster centroids (C), wherein the cluster images are selected in order to provide for a reference anomaly centroids information.

6. The method according to claim 4,
wherein said image data (OT) is constituted by an input of an optical monitoring system of a powder bed fusion device, a CCD or sCMOS Camera, and said image data forms a test reference.

7. The method according to claim 1, further comprising:
using the computed threshold values as input parameters for a subsequent anomaly detection, thresholding or image processing method.

8. The method according to claim 1, further comprising:
marking an anomaly (a) in each layer (L) of the image data set and forming into anomaly clusters.

9. The method according to claim 8, further comprising:
determining a location and/or a size of the respective anomaly cluster with reference to the actual workpiece geometry.

10. The method according to claim 9, further comprising:
storing an anomaly cluster information, comprising a location, a size and/or a severity indicator of a given anomaly cluster in a report file.

11. The method according to claim 9, further comprising:
correlating an anomaly cluster information, comprising a location, a size and/or a severity indicator of a given anomaly cluster with real material or manufacturing defects.

12. A method of manufacturing a workpiece out of a powder bed by selective laser sintering, selective laser melting or electron beam melting, comprising:
applying the computer-implemented anomaly detection method according to claim 1.

13. A data processing apparatus configured to carry out the method of claim 1, comprising:
an interface to a powder bed fusion device or a related monitoring system.

14. A non-transitory computer readable medium having a computer program product (CPP) stored thereon, comprising:
instructions which, when executed by a data processing apparatus or a computer, cause it to carry out the method of claim 1.

15. The method according to claim 1,
wherein the defined color space comprises a Lab (Lab) color space or greyscale (GV) spectrum.

16. The method according to claim 8,
wherein the anomaly is formed into anomaly clusters by using a nearest neighbor search algorithm, a Connected Component Labeling, a Proximity or Closest Point Search, a Point Location or Point in Triangle Search or a k-Nearest Neighbor algorithm.

17. A computer-implemented anomaly detection method in powder-bed-based additive manufacture of a workpieces, comprising:
(i) providing an image data set (OT) and applying a Principal Component Analysis (PCA) to analyze said image data to compute a number of image clusters (C),
(ii) applying a clustering algorithm to the analysed image data and computing respective cluster centroids (C),
(iii) comparing the computed cluster centroids (C) with a set of reference anomaly centroids, wherein, based on a match of cluster centroids with the reference anomaly centroids, the image data is segmented layerwise into segmented cluster images of a specific anomaly,
(iv) transforming the segmented cluster images into a defined color space, and
(v) integrating a pixel information of the transformed segmented cluster images to compute a threshold value for the image data set in order to determine a respective anomaly (a, t).

* * * * *